United States Patent
Clarke

(10) Patent No.: US 8,799,368 B2
(45) Date of Patent: Aug. 5, 2014

(54) EMAIL SERVER FOR PROCESSING A THRESHOLD NUMBER OF EMAIL JOBS FOR A GIVEN USER AND RELATED METHODS

(75) Inventor: David James Clarke, Redmond, WA (US)

(73) Assignee: BlackBerry Limited, Waterloo, Ontario (CA)

(*) Notice: Subject to any disclaimer, the term of this patent is extended or adjusted under 35 U.S.C. 154(b) by 1723 days.

(21) Appl. No.: 11/383,272

(22) Filed: May 15, 2006

(65) Prior Publication Data
US 2007/0073720 A1 Mar. 29, 2007

Related U.S. Application Data

(60) Provisional application No. 60/721,795, filed on Sep. 29, 2005.

(51) Int. Cl.
*G06F 15/173* (2006.01)
*G06F 9/46* (2006.01)
*G06F 15/16* (2006.01)
*H04L 12/58* (2006.01)
*H04L 29/08* (2006.01)

(52) U.S. Cl.
CPC .............. *H04L 51/36* (2013.01); *G06F 9/466* (2013.01); *H04L 67/18* (2013.01); *H04L 67/1097* (2013.01)
USPC ............ 709/206; 718/101; 709/217; 709/218

(58) Field of Classification Search
CPC ..... H04L 51/36; H04L 67/18; H04L 67/1097; G06F 9/466
USPC ............................. 709/206, 217–218; 718/101
See application file for complete search history.

(56) References Cited

U.S. PATENT DOCUMENTS

| | | | | |
|---|---|---|---|---|
| 5,832,218 | A * | 11/1998 | Gibbs et al. | 709/203 |
| 6,249,807 | B1 | 6/2001 | Shaw et al. | 709/206 |
| 6,779,019 | B1 | 8/2004 | Mousseau et al. | 709/206 |
| 7,080,123 | B2 * | 7/2006 | Freed | 709/206 |
| 7,814,141 | B2 * | 10/2010 | Parsons et al. | 709/202 |
| 2003/0115270 | A1 | 6/2003 | Funk et al. | 709/206 |
| 2003/0151623 | A1 * | 8/2003 | Shimada et al. | 345/752 |
| 2003/0158883 | A1 | 8/2003 | Drudis et al. | 709/102 |
| 2003/0208544 | A1 * | 11/2003 | Wilson | 709/206 |

FOREIGN PATENT DOCUMENTS

| | | | |
|---|---|---|---|
| ER | 0491367 | 6/1992 | G06F 13/14 |
| WO | WO2004032438 | * 4/2004 | |

OTHER PUBLICATIONS

Nair, *Asynchronous Socket Programming in C#—Part I, Client Server Example with Multiple Simultaneous Clients*, Mar. 4, 2005, available at .codeguru.com.
Schribner, *Working with Asynchronous .NET Web Service Clients*, Sep. 16, 2004, available at .codeguru.com.
Skonnard, *Introducing the Web Services Enhancements 2.0 Messaging API*, MSDN Magazine, Sep. 2003, available at .msdn.microsoft.com/msdnmag.

* cited by examiner

*Primary Examiner* — Camquy Truong
(74) *Attorney, Agent, or Firm* — Allen, Dyer, Doppelt, Milbrath & Gilchrist, P.A.

(57) ABSTRACT

An electronic mail (email) server may include a pending email job queue manager for storing a plurality of email jobs for a plurality of users, and a processing email job queue manager. The processing email job queue manager may be for processing a threshold number of email jobs from the pending email job queue manager for a given user if a plurality of email jobs greater than the threshold number are available from the pending email job queue manager for the given user.

16 Claims, 11 Drawing Sheets

EMAIL SERVER FOR PROCESSING A THRESHOLD NUMBER OF EMAIL JOBS FOR A GIVEN USER AND RELATED METHODS

CROSS-REFERENCE TO RELATED APPLICATIONS

This application claims the benefit of U.S. Provisional Application No. 60/721,795, filed Sep. 29, 2005, which is hereby incorporated herein in its entirety by reference.

FIELD OF THE INVENTION

The present invention relates to the field of communications systems, and, more particularly, to electronic mail (email) communications systems and related methods.

BACKGROUND OF THE INVENTION

Electronic mail (email) has become an integral part of business and personal communications. As such, many users have multiple email accounts for work and home use. Moreover, with the increased availability of mobile cellular and wireless local area network (LAN) devices that can send an receive emails, many users wirelessly access emails stored in source mailboxes of different email storage servers (e.g., corporate email storage server, Yahoo, Hotmail, AOL, etch.).

Yet, email distribution and synchronization across multiple mailboxes and over wireless networks can be quite challenging, particularly when this is done on a large scale for numerous users. For example, different email accounts may be configured differently and with non-uniform access criteria. Moreover, as emails are received at the wireless communications device, copies of the emails may still be present in the original mailboxes, which can make it difficult for users to keep their email organized.

One particularly advantageous "push" type email distribution and synchronization system is disclosed in U.S. Pat. No. 6,779,019 to Mousseau et al., which is assigned to the present Assignee and is hereby incorporated herein in its entirety by reference. This system is for pushing user-selected data items from a host system to a user's mobile data communication device upon detecting the occurrence of one or more user-defined event triggers. The user may then move (or file) the data items to a particular folder within a folder hierarchy stored in the mobile data communication device, or may execute some other system operation on the data item. Software operating at the mobile device and the host system then synchronizes the folder hierarchy of the mobile device with a folder hierarchy of the host system, and any actions executed on the data items at the mobile device are then automatically replicated on the same data items stored at the host system, thus eliminating the need for the user to manually replicate actions at the host system that have been executed at the mobile data communication device.

The foregoing system advantageously provides great convenience to users of wireless email communication devices for organizing and managing their email messages. Yet, further convenience and efficiency features may be desired in email distribution and synchronization systems as email usage continues to grow in popularity.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternate embodiments.

Generally speaking, the present description is directed to a direct access electronic mail system and, more particularly, to an electronic mail (email) server. The email server may include a pending email job queue manager for storing a plurality of email jobs for a plurality of users, and a processing email job queue manager. The processing email job queue manager may be for processing a threshold number of email jobs from the pending email job queue manager for a given user if a plurality of email jobs greater than the threshold number are available from the pending email job queue manager for the given user.

The pending email job queue manager may store the plurality of email jobs in an order they are received for each user. Moreover, the processing email job queue manager may process the threshold number of email jobs from the pending email job queue manager in the order they are received for the given user. In addition, the processing email job queue manager may sequentially process the threshold number of email jobs from the pending email job queue manager for the given user.

The processing email job queue manager may include a plurality of processing threads, and each processing thread may process a threshold number of email jobs from the pending email job queue manager for a respective given user if a plurality of email jobs greater than the threshold number are available from the pending email job queue manager for the given user. Also, the processing email job queue manager may cooperate with at least one email storage server to process the email jobs, and perform an initialization with the at least one email storage server prior to processing the threshold number of email jobs for the given user. Additionally, the pending email job queue manager may compare email jobs and discard duplicates prior to storing.

Other related aspects are for a method for email processing, a communications system including an email proxy server, such as the one described briefly above, and a computer-readable medium.

Figure 1:
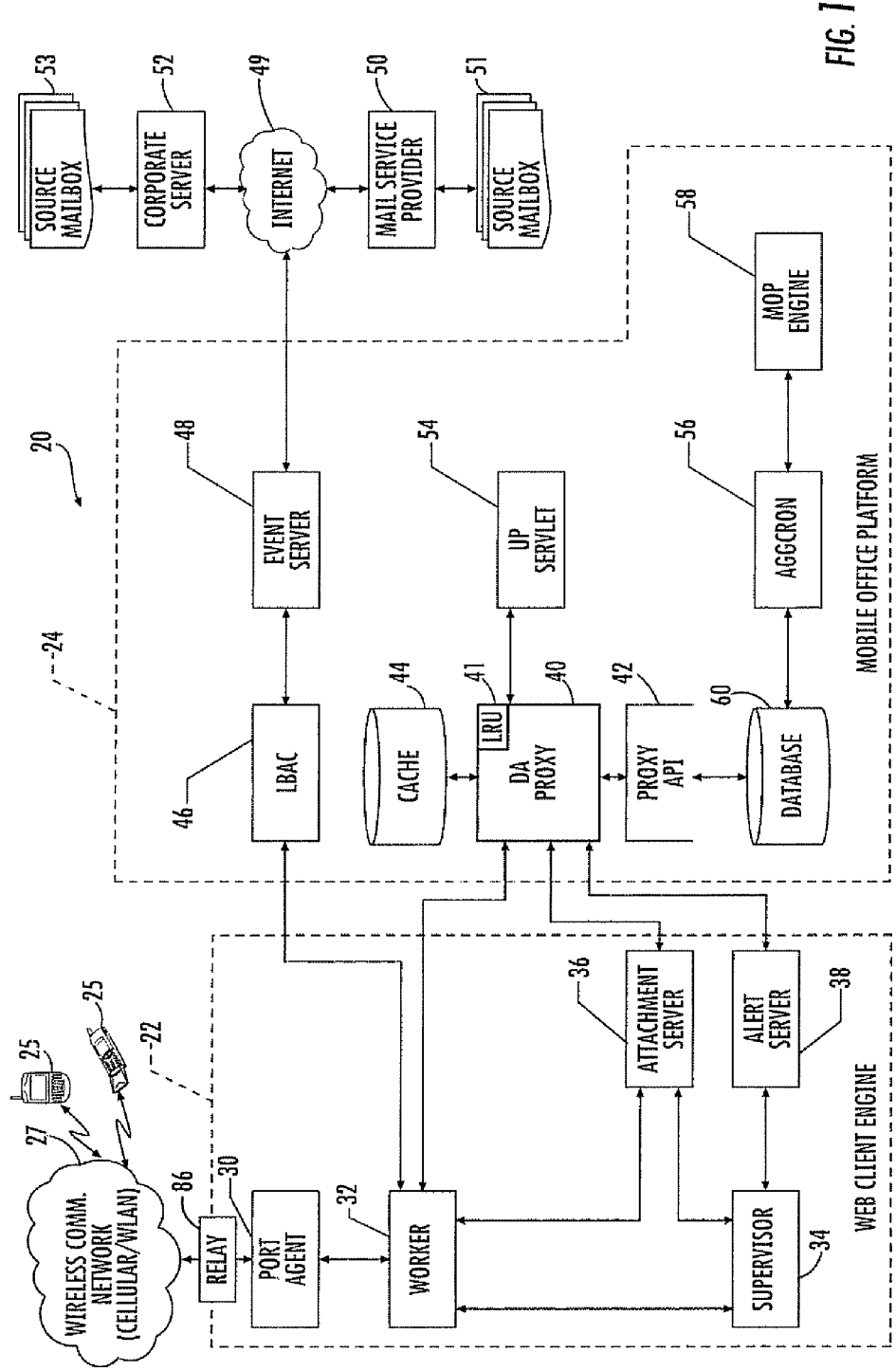
FIG. 1 is schematic block diagram of a direct access electronic mail (email) distribution and synchronization system in accordance with the present invention.

Referring initially to FIG. 1, a direct access (DA) email distribution and synchronization system 20 allows direct access to different mail sources, allowing messages to be transferred directly to a mobile wireless handheld device from a source mailbox. As a result, different mail stores need not be used for integrated external source mail accounts, and a permanent copy of an email in a local email store is not required.

Although this diagram depicts objects as functionally separate, such depiction is merely for illustrative purposes. It will be apparent to those skilled in the art that the objects portrayed in this figure can be arbitrarily combined or divided into separate software, firmware or hardware components. Furthermore, it will also be apparent to those skilled in the art that such objects, regardless of how they are combined or divided, can execute on the same computing device or can be arbitrarily distributed among different computing devices connected by one or more networks.

The direct access system 20 enables email users or subscribers to have email from third-party email services pushed to various mobile wireless communications devices 25. Users need not create a handheld email account to gain direct access to an existing external email account. The direct access system 20 may operate without performing aggregation as used in some prior art systems, in which emails are aggregated from multiple different source mailboxes to a single target mailbox. In other words, email need not be stored in an intermediate target mailbox, but instead may advantageously be accessed directly from a source mail store.

As illustrated in FIG. 1, the direct access system 20 illustratively includes a Web client (WC) engine 22 and a mobile office platform (MOP) 24. These Web client engine 22 and mobile office platform 24 operate together to provide users with direct access to their email from mobile wireless communications devices 25 via one or more wireless communications networks 27, for example. Both the Web client engine 22 and the mobile office platform 24 may be located at the same location or at separate locations, and implemented in one or more servers. The web client engine 22 illustratively includes a port agent 30 for communicating with the wireless communications devices 25 via the wireless communications network(s) 27, a worker 32, a supervisor 34, and an attachment server 36, which will be discussed further below. An alert server 38 is shown in dashed lines, and in one preferred embodiment, is not used, but could be part of the system in yet other embodiments.

The mobile office platform 24 illustratively includes a DA proxy 40, and a proxy application programming interface (API) 42 and a cache 44 cooperating with the DA proxy. The mobile office platform 24 also illustratively includes a load balance and cache (LBAC) module 46, an event server 48, a universal proxy (UP) Servlet 54, an AggCron module 56, a mobile office platform (MOP) engine 58, and a database (DB) engine 60, which will be discussed in further detail below. The Least Recently Used (LRU) cache 41 caches new messages, and can release messages and objects that were least recently used.

The supervisor 34 processes new mail notifications that it receives from the direct access proxy 40. It then assigns a job, in the form of a User Datagram Protocol (UDP) packet, to the least-loaded worker 32, according to the most recent UDP heartbeat the supervisor 34 has received. For purposes of this description, heartbeat is a tool that monitors the state of the server. Additionally, the supervisor 34 will receive a new service book request from the direct access proxy 40 to send service books to the mobile wireless communication device for new or changed accounts. A service book can be a class that could contain all service records currently defined. This class can be used to maintain a collection of information about the device, such as connection information or services, such as an email address of the account.

The worker 32 is an intermediary processing agent between the supervisor 34 and the port agent 30, and responsible for most processing in the Web client engine 22. It will retrieve e-mail from a universal proxy 54, via a direct access proxy, and format e-mail in Compressed Multipurpose Internet Mail Extension (CMIME) as a type of Multipurpose Internet Mail Extension, and send it to the port agent 30, for further processing. Its responsibilities include the following tasks: (1) messages sent to and received from the handheld; (2) message reply, forward and more requests; (3) Over-The-Air Folder Management operation (OTAFM); (4) attachment viewing; and (5) service book.

The port agent 30 acts as a transport layer between the infrastructure and the rest of the Web client engine 22. It is responsible for delivering packets to and from the mobile wireless communications device. To support different integrated mailboxes with one device, more than one service book can be used, and each service book can be associated with one integrated mailbox. A port agent 30 can include one Server Relay Protocol (SRP) connection to a relay, but it can also handle multiple SRP connections, and each connection may have a unique Globally Unique Identifier (GUID) associated with a service book. The attachment server 36 provides service for document/attachment conversion requests from workers 32.

The direct access proxy 40 provides a Web-based Distributed Authoring and Versioning (WebDAV) interface that is used by the worker 32 to access account and mailbox information. This provides functionality to create, change and move documents on a remote server, e.g., a Web server. The direct access proxy 40 typically will present an asynchronous interface to its clients. The LBAC module 46 is used by a notification server and the Web client engine 22 components to locate the proper DA proxy for the handling of a request. The universal proxy Servlet 54 abstracts access to disparate mail stores into a common protocol. The event server 48 responds to notifications of new messages front corporate servers 52 and/or mail service providers 50, which may be received via the Internet 40, for example. The notifications are communicated to the direct access proxy 40 by the AggCron module 56 and the event server 48 so that it may initiate checking for new mail on source mailboxes 51, 53 of the mail service providers 50 and/or corporate servers 52. The proxy API can be a Simple Object Access Protocol (SOAP) Daemon 42 and is the primary interface into a database 60, which is the primary data store for the mobile office platform 24. The AggCron module 56 may also periodically initiate polling for new messages as well.

Figure 2:
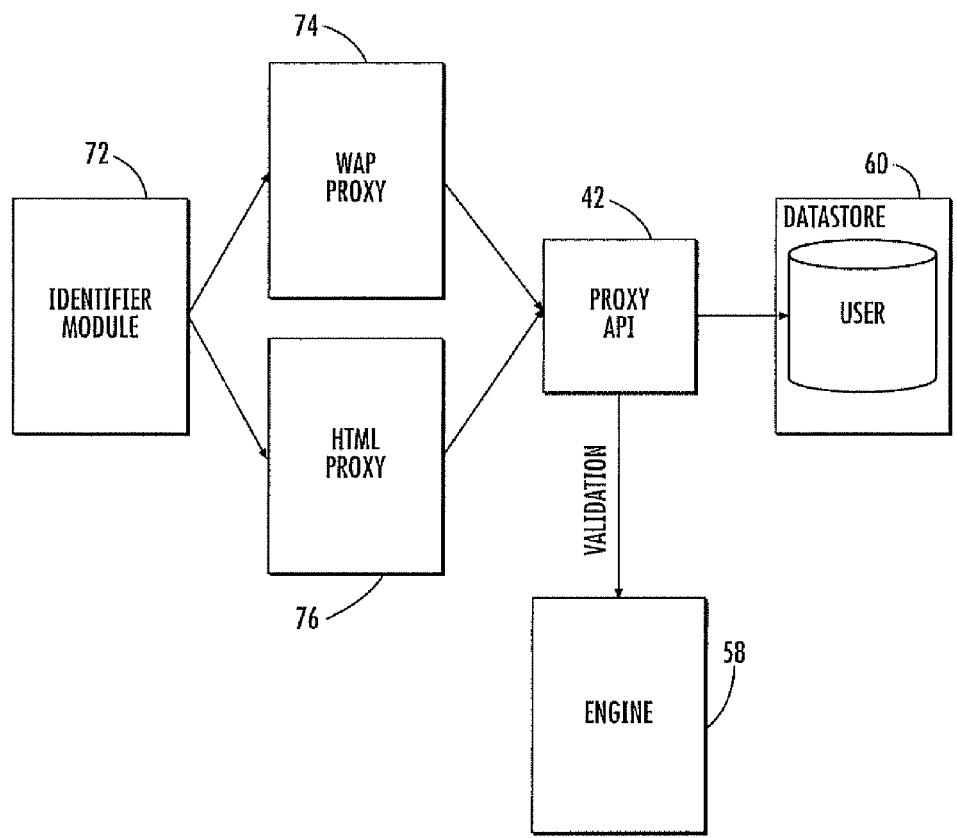
FIG. 2 is a schematic block diagram of an exemplary embodiment of user interface components of the direct access proxy of the system of FIG. 1.

FIG. 2 is a high-level block diagram showing user interface components of the direct access proxy 40. More particularly, the direct access proxy 40 illustratively includes an identifier module 72 with various downstream proxy modules for different communication formats, such as a Wireless Application Protocol (WAP) proxy module 74 and a Hypertext Markup Language (HTML) proxy module 76. Of course, it will be appreciated by those skilled in the art that other types of proxy modules for other communications formats may also be used.

The identifier module 72 provides a centralized authentication service for the direct access system 20 and other services. An authentication handshake may be provided between an ID service and direct access system 20 to ensure that users have the proper credentials before they are allowed access to the direct access system 20. The ability to switch from managing a Web client to a direct access system, or vice versa, may occur without requiring the user to re-enter any login credentials. Any Web client and direct access may share session management information on behalf of a user.

The WAP proxy 74 provides a wireless markup language (WML)-based user interface for configuring source mailboxes with the mobile office platform 24. The HTML proxy 76 provides an HTML-based user interface for configuring of source mailboxes in the MOP 24. The proxy API 42 (SOAP Daemon) is the primary interface into the database 60. The engine 58 is a protocol translator that connects to a source mailbox to validate configuration parameters. The database 60 is the primary user data store for the mobile office platform 24.

Figure 3:
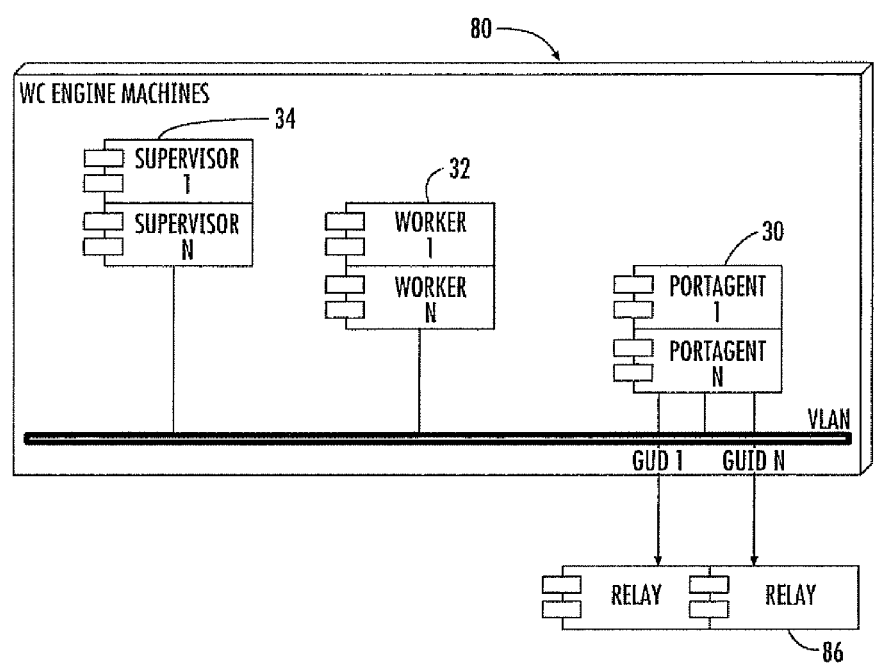
FIG. 3 is a schematic block diagram of an exemplary embodiment of the Web client engine of the system of FIG. 1
Figure 4:
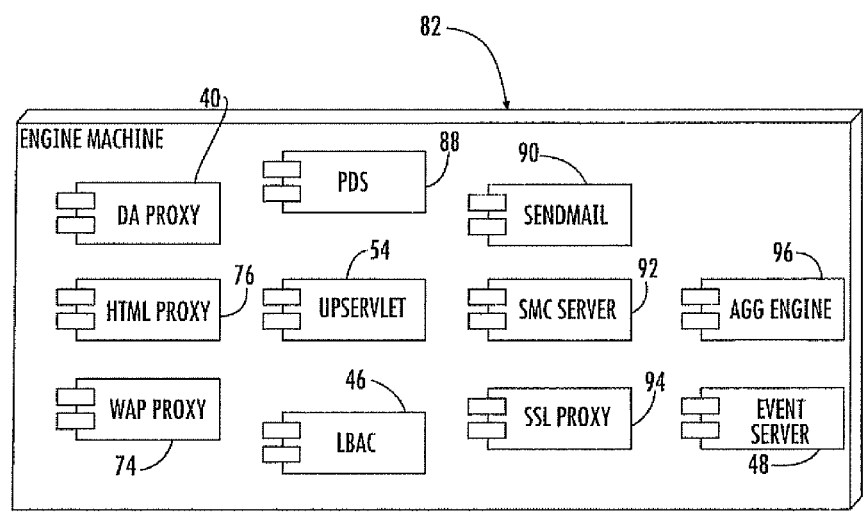
FIG. 4 is a schematic block diagram of an exemplary embodiment of the mobile office platform engine machine for use in the system of FIG. 1.
Figure 5:
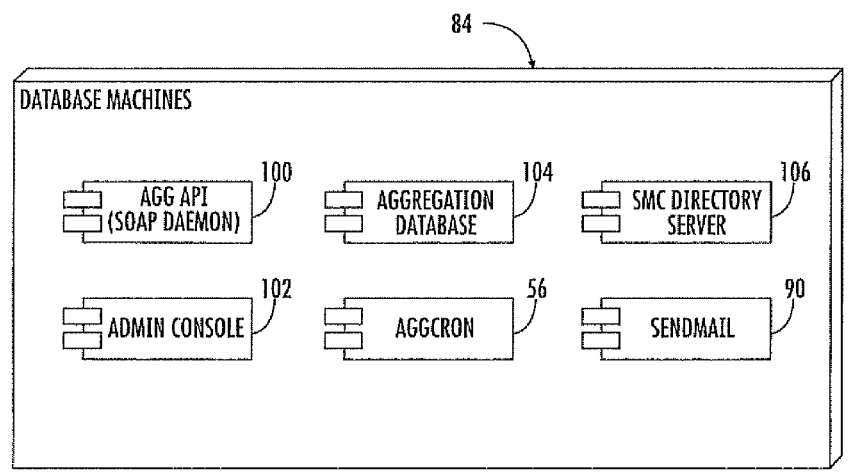
FIG. 5 is a schematic block diagram of an exemplary embodiment of the database module of the system of FIG. 1.

FIGS. 3, 4 and 5 illustrate respective Web client engine machines 80 (FIG. 3), an engine machine 82 (FIG. 4), and database machine 84 (FIG. 5). The Web client engine machine 80 illustratively includes the supervisors 34, workers 32, and port agents 308. Relays 86 cooperate with the port agents 38 using a GUID.

The engine machine 82 illustratively includes a direct access proxy 40, HTML proxy 76, WAP proxy 74, PDS module 88, UP Servlet 54, LBAC module 46, a send-mail module 90, an secure mail client (SMC) server 92, a secure sockets layer (SSL) proxy 94, an aggregation engine 96, and event server 48. The SMC server 92 cooperates with corresponding SMC modules resident on certain corporate networks, for example, to convey email data between the mobile office platform 24 and source mailboxes. The database machine 84 may include an aggregation application programming interface (API) 100 as a SOAP Daemon, an administration console 102, an aggregation database 104, the AggCron module 56, an SMC directory server 106, and a send mail module 90.

The various components of the Web client engine 22 may be configured to run on different machines or servers. The component binaries and configuration files may either be placed in a directory on the network or placed on a local disk that can be accessed to allow the appropriate components to run from each machine. In accordance with one exemplary implementation, deployment may include one supervisor, two workers, and one port agent for supporting 30,000 external source mailboxes, although other configurations may also be used. Actual production deployment may depend on the results of load, performance and stress testing, as will be appreciated by those skilled in the art.

For the mobile office platform 24 direct access components, modules and various functions, machines are typically installed in two configurations, namely engine machines (FIG. 4) and database machines (FIG. 5). While these machines may have all of the above-described components installed on them, not all of these components need be active in all applications (e.g., aggregation may be used with systems that do not support push technology, etc.). Once again, actual production deployment may depend on the results of load, performance and stress testing.

The mobile office platform 24 architecture in one known technique advantageously uses a set of device/language-specific extensible Stylesheet Language (XSL) files, which transform application data into presentation information. In one non-limiting example, a build process takes a non-localized XSL file and generates a localized XSL file for each supported language. When the XSL file is used, it is "compiled" in memory and cached for repeated use. The purpose of pre-localizing and caching the templates is to reduce the CPU cycles required to generate a presentation page.

Branding may also be performed. Initially, a localized XSL file may build a WAP application to access aggregated email accounts. A WAP proxy application may be localizable and support multiple WAP devices. For each logical page of an application, a device-specific XSL file may be created, which may be localized for each language/country supported. This rendering scheme may support not only WAP devices, but also SMTP, HTML and POP proxies, for example. In branding, each page of a given application may be customized for each different brand.

The branding of a page may be accomplished through XSL file imports, including the use of a Java application programming interface (API) for XML processing (JAXP) feature to resolve the imports dynamically. This need not require that each combined page/brand template be compiled and cached. By way of example, in a sample template directory, first and second pages for a single language/country may be combined with branded counterparts to generate a plurality of distinct template combinations. It is also possible to profile memory requirements of an application by loading templates for a single language, device/application and brand. An HTML device may include a set of templates that are large compared to other devices.

In one known technique, the mobile office platform 24 advantageously builds processes and takes non-localized files and language-specific property files and combines them to make each non-localized XSL file into an XSL file for each supported language. A separate XSL file for each language need not be used, and the language factor may be removed from the memory usage equation. A JAXP API may be used to extend XSL file with Java classes. The extensions may take various forms, for example, including extension elements and extension functions. A template may be transformed by creating and initializing an extension object with a locale and passing an object to a transformer. The system can remove multiple imports and use less memory. HTML templates can use template importing to enable template reuse, much like Java classes, and reuse other Java classes through a mechanism like derivation or importing.

Figure 6:
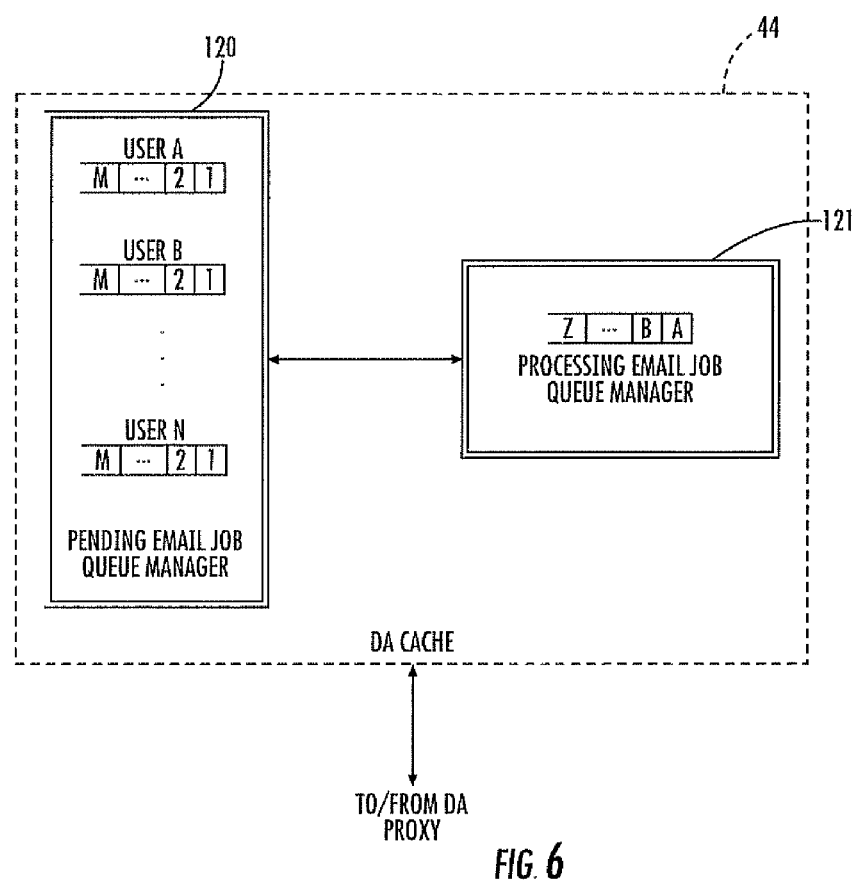
FIG. 6 is a schematic block diagram of an exemplary embodiment of the direct access proxy cache of the system of FIG. 1.

Turning additionally to FIG. 6, one exemplary implementation of the direct access cache 44 is now described. The direct access cache 44 may include a pending email job queue manager 120 for storing a plurality of email jobs (1-M) for a plurality of users (A-N). More particularly, a certain number of users A-N are assigned to the pending email job queue manager 120. As respective email jobs are received for the users A-N, the pending email job queue manager 120 cooperates with the DA proxy 40 to store the email jobs in the order they are received by user, as shown.

Different numbers of users may be assigned to the pending email job queue manager 120 depending upon the size of the email system, memory constraints, efficiency requirements, etc., and more than one pending email job queue manager may be used as well, as will be appreciated by those skilled in the art. By way of example, each pending email job queue manager 120 may typically support thousands or tens of thousands of users for a relatively large scale email distribution/synchronization system. In the above-noted example, 30,000 users are assigned to each pending email job queue manager 120, although other numbers may also be used.

The direct access cache 44 further illustratively includes a processing email job queue manager 121 for processing a plurality of email jobs from the pending email job queue manager 120 for a given one of the users, if available. Otherwise, the processing email job queue manager 121 processes one or more email jobs from the pending email job queue manager 120 for a different user.

More particularly, the processing email job queue manager 121 illustratively includes a plurality of processing threads (A-Z) each for processing jobs for a respective user. Preferably, each processing thread processes a single job for a given user at a time, and processes the plurality of email jobs for the given user in a sequence (i.e., it processes jobs for the given user one after the other). Moreover, the processing email job queue manager 121 also preferably performs the jobs in the order they are received by the pending email job queue manager 120. However, in some embodiments the jobs may be processed in different orders (e.g., based upon the priority of the email job, etc.).

The processing threads also work in "parallel" in that they each process email jobs for their own respective given users at the same time. Yet, is should be noted that the number of processing threads in the processing email job queue manager 121 need not be the same as the number of users that the pending email job queue manager 120 is configured for, and may typically be less. Thus, a given processing thread may in one instant be processing jobs for one user, and in the next instant be processing jobs for a different user.

The pending and processing email job queue managers 120, 121 may be implemented in a variety of configurations apart from the direct access system 20 described herein using hardware and/or software components/modules. For example, the pending and processing email job queue managers 120, 121 may be implemented as software modules in a separate email proxy server, as will be appreciate by those skilled in the art.

The processing email job queue manager 121 will often need to cooperate with an email storage server to process a given email job. That is, the processing email job queue manager 121 may need to initialize a connection (including validating a user ID and password, etc.) with mail service providers 50 and corporate servers 52 prior to processing an email job for the given user, such as retrieving/sending an email or synchronizing email folders, etch, as discussed further below. As such, the processing email job queue manager 121 may cooperate with the direct access proxy 40 to perform a logon sequence with the mail service provider 50 or corporate server 52 based upon the given user's identification and password information to obtain access to the given user's source mailbox 51, 53, respectively.

If the processing email job queue manager 121 were simply to process email jobs stored in the pending email job queue manager 120 in the order they were received irrespective of the user with which the email jobs are associated (i.e., first-in, first-out), the processing email job queue manager would end up skipping back and forth between different users. As such, the processing email job queue manager 121 may have to repeatedly initialize a new connection with the mail service provider 50 or corporate server 52 each time it is to process a new email job for the given user. Yet, by processing a plurality of email jobs for a given (i.e., same) user, if available, this allows the processing email job queue manager 121 to process multiple email jobs in a row without the need to initialize a connection before every such job, providing significant gains in processing efficiency.

While greater efficiencies may be obtained by sequentially processing a plurality of email jobs for a same user when possible, in some circumstances fairness to other users may warrant limiting the number of email jobs processed for a particular user. That is, if a large number of email jobs are queued up for a given user, it would be unfair to other users to process all of the email jobs for the given user, as this may result in undue delay in processing email jobs of other users.

Accordingly, in some embodiments the processing email job queue manager 121 may advantageously process a threshold number of email jobs from the pending email job queue manager 120 for the given user if a plurality of pending jobs email jobs greater than the threshold number are available from the pending email job queue manager for the given user. That is, if more than a threshold number of jobs are pending for a given user, a processing thread of the processing email job queue manager 121 may advantageously process only the threshold number of these jobs before switching to a different user. By way of example, the threshold number may be greater than about three (e.g., five), although the threshold numbers may be set to different numbers depending upon the given implementation.

To promote still further efficiencies, the pending email job queue manager 120 may advantageously compare the stored email jobs for duplicate email jobs. By way of example, duplicate email jobs may occur when an interfacing application times out and continues to send duplicate requests. In such instances, the pending email job queue may determine that later email jobs are duplicates of another previously received job and discard them so that they are not stored or processed by the processing email job queue manager 121.

Figure 7:
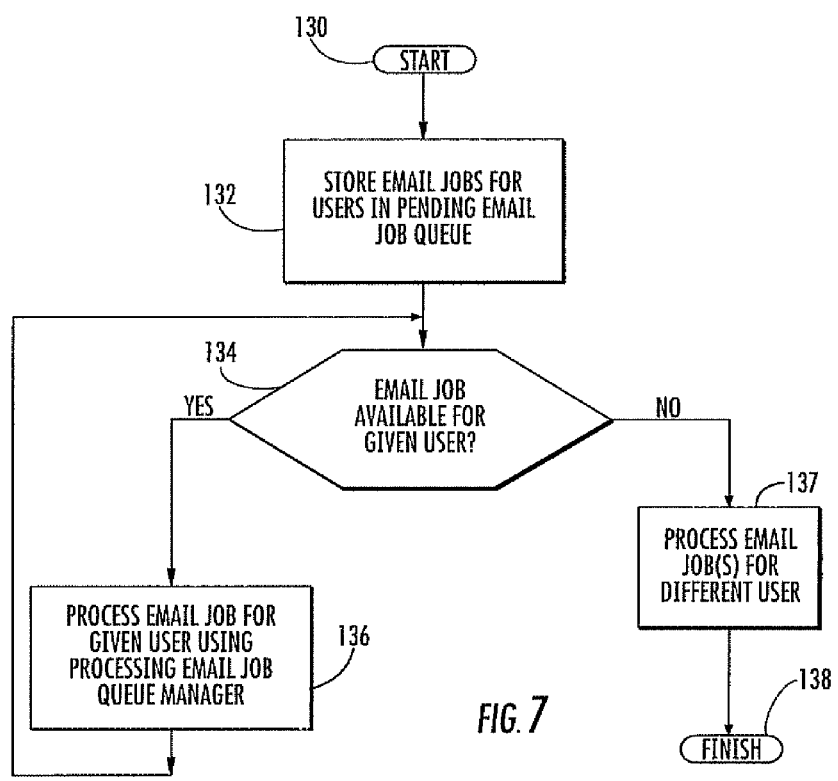
FIGS. 7 through 9 are flow diagrams illustrating methods for using the direct access proxy cache of FIG. 6.

Related method aspects will now be described initially with reference to FIG. 7. Beginning at Block 130, a plurality of email jobs for a plurality of users are stored in the pending email job queue manager 120, at Block 132. Moreover, the method further illustratively includes processing a plurality of email jobs for a given user, if available, from the pending email job queue manager 120 using the processing email job queue manager 121, at Blocks 134, 136. If no email jobs are available for the given user, then the processing email job queue manager 121 processes one or more email jobs (and preferably a plurality, if available) for another user, at Block 137, thus concluding the illustrated method at Block 138.

Figure 8A:
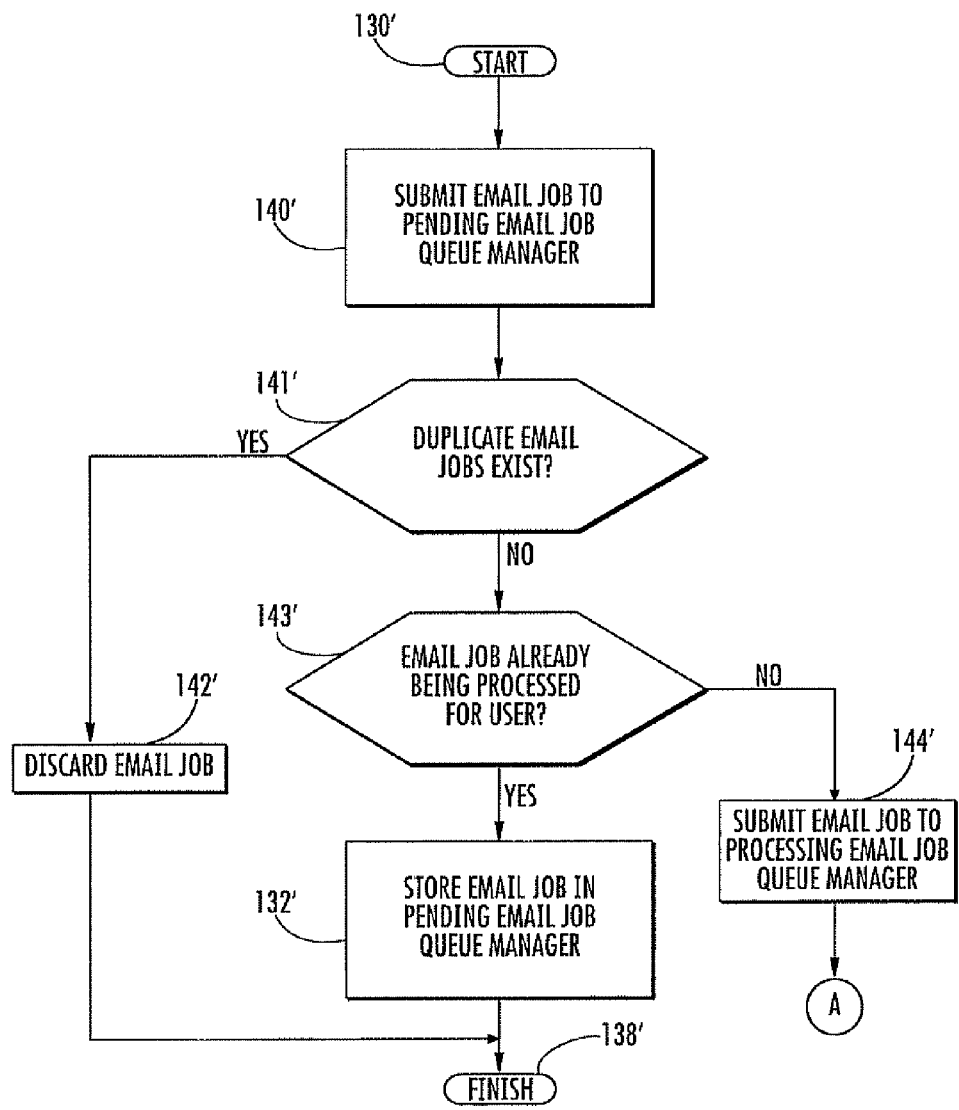

Turning additionally to FIG. 8A, additional method aspects associated with the pending email job queue manager 120 are now described. Prior to storing an email job, the pending email job queue manager 120 may first compare the stored email jobs with a newly submitted job to determine if the newly submitted job is a duplicate of a previously stored job, at Blocks 140, 141'. If so, the newly submitted job is discarded, at Block 142', and not stored in the pending email job queue manager 120. Of course, in other embodiments the newly submitted job may first be stored by the pending email job queue manager 120 and thereafter be deleted upon determining that the job is a duplicate of a previously stored job.

If the newly submitted email job is not a duplicate of another job already stored in the pending email job queue manager 120, if the processing email job queue manager 121 is not already processing another job for the given user then the job is submitted directly to the processing email job queue manager 121 without being stored in the pending email job queue manager 120, at Blocks 143'-144'. That is, if none of the processing threads of the processing email job queue manager 121 is already processing an email job for the given user, then the newly submitted job proceeds directly to the processing email job queue manager 121, which is notified accordingly.

Figure 8B:
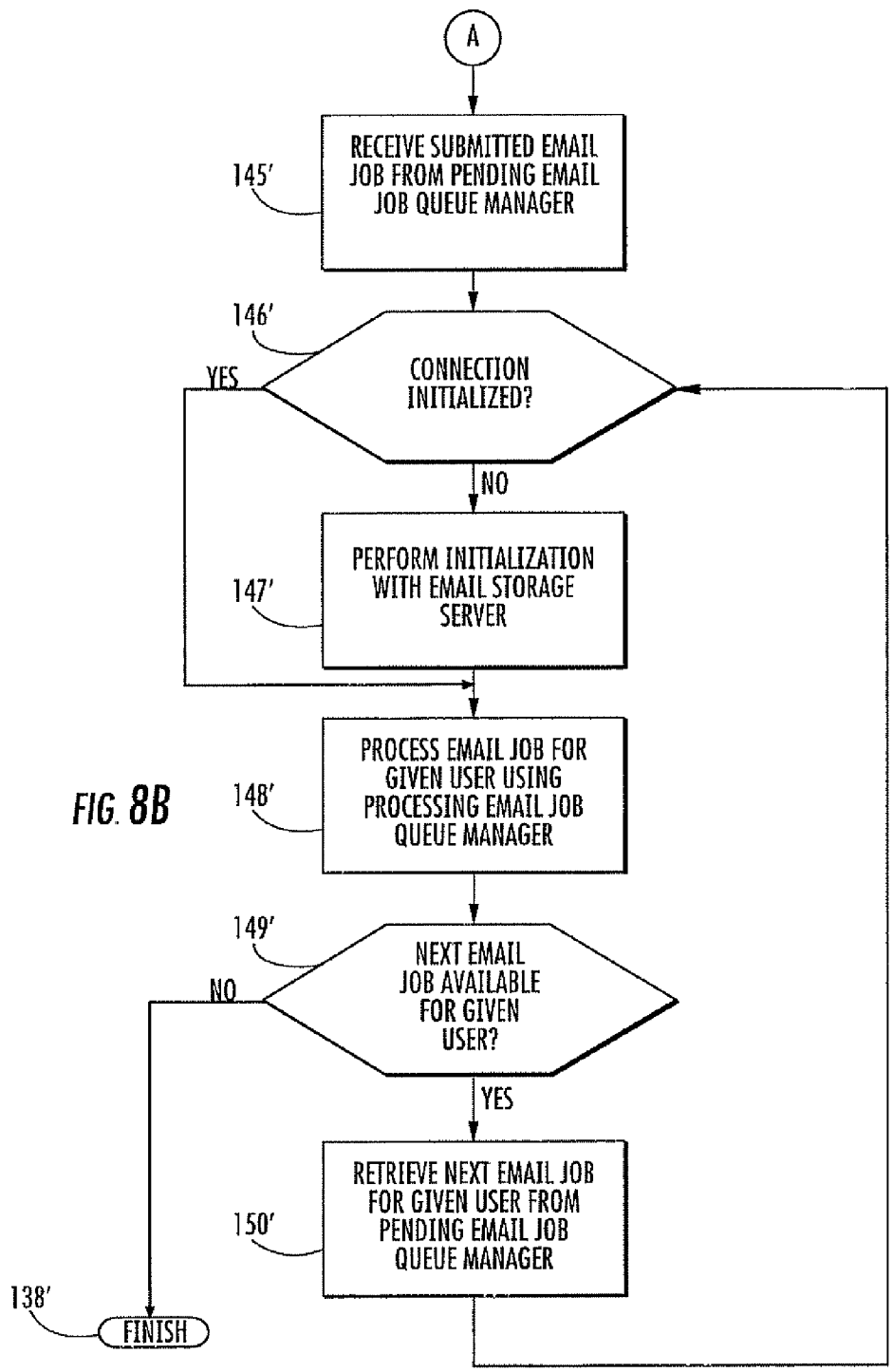

Turning additionally to FIG. 8B, the corresponding method operations associated with the processing email job queue manager 121 are now described. Upon receiving the newly submitted email job, at Block 145', if no connection with the email storage server is already initialized then the processing email job queue manager initializes a connection, at Blocks 146'-147', and processes the email job (Block 148'). If a connection is already initialized, then the initialization step illustrated at Block 147', is skipped. As discussed further above, by sequentially processing a plurality of email jobs for a given user, the initialization need only be performed prior to processing the first of the email jobs, which advantageously conserves processing resources.

Once the email job has been processed by a particular processing thread, the thread then determines if a next email job has been stored in the pending email job queue manager for processing, at Block 149', and if so then retrieves the next job (Block 150') and processes it. Otherwise, the processing thread may move on to processing pending email jobs for other users. Of course, other configurations besides service books may also be used.

Figure 9:
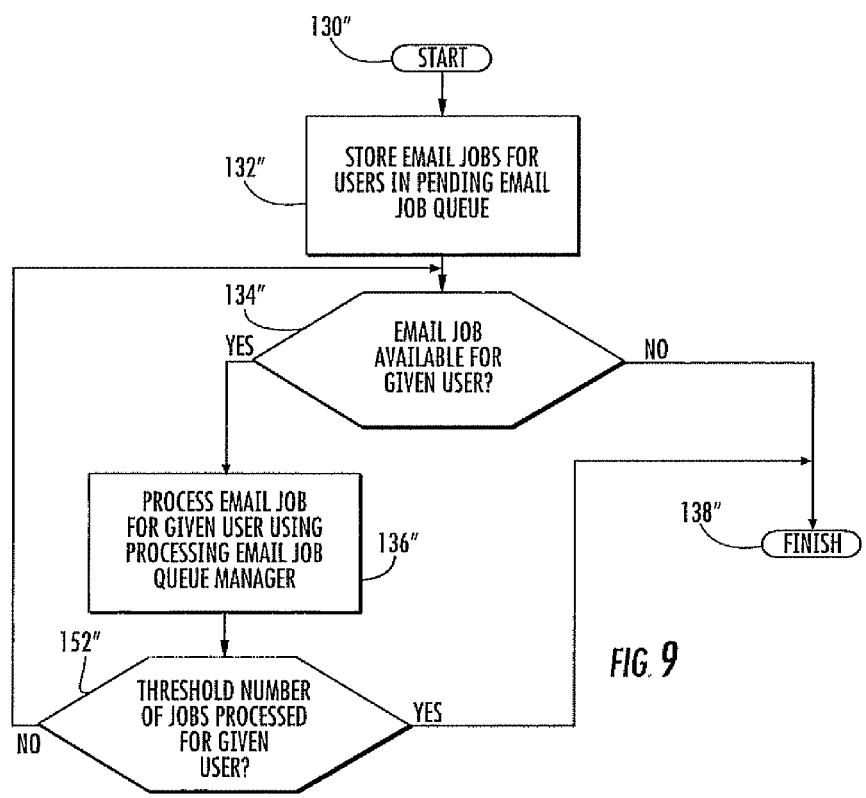

Referring now to FIG. 9, beginning at Block 130", another method aspect includes storing a plurality of email jobs for a plurality of users in a pending email job queue manager, at Block 132". The method further illustratively includes processing a threshold number of email jobs from the pending email job queue manager 120 for a given user if a plurality of email jobs greater than the threshold number are available from the pending email job queue manager for the given user, at Blocks 134", 136", 152". The method illustratively concludes, at Block 138", upon processing the threshold number of jobs for the given user, although processing of email jobs for other users would then typically commence in actual operation.

In the direct access system 20, users receive email on their mobile wireless communications devices 25 from multiple external accounts, and when replying to a received message, the reply-to and sent-from address integrity is preserved. For example, for a user that has an integrated Yahoo! account (user@yahoo.com) and a POP3 account (user@pop3.com), if they receive an email at user@yahoo.com, their replies generated from the device 25 will appear to come from user@yahoo.com. Similarly, if a user receives an email at user@pop3.com, their replies will appear to come from user@pop3.com.

Selection of the "sent from" address is also available to a user that composes new messages. The user will have the ability to select the "sent from" address when composing a new message. Depending on the source mailbox type and protocol, the message may also be sent through the source mail service. This functionality can be supported by sending a configuration for each source mailbox, for example, as a non-limiting example, a service book for each source mailbox 51, 53 to the mobile wireless communications device 25.

As noted above, a service book is a class that may include all service records currently defined. This class may be used to maintain a collection of information about the device, such as connection information. The service book may be used to manage HTTP connections and mail (CMIME) information such as account and hierarchy. At mobile wireless communications devices 25, a delete service book request may be sent when a source mailbox 51, 53 is removed from the account. The service book may also be resent to the device 25 with a viewable name that gives the user some indication that the selection is no longer valid.

A sent items folder may also be "synchronized." Any device-originated sent messages may be propagated to a source account and stored in a sent mail folder, for example. Also, messages deleted on the device 25 may correspondingly be deleted from the source mailbox 51, 53. Another example is that device-originated marking of a message as read or unread on the device 25 may similarly be propagated to the source mailbox 51, 53. While the foregoing features are described as source-dependent and synchronizing one-way, in some embodiments certain synchronization features may in addition, or instead, propagate from the source mailbox/account to the handheld device, as will be appreciated by those skilled in the art.

When available, the mail service provider or corporate mail server may be used for submission of outgoing messages. While this may not be possible for all mail service providers or servers, it is preferably used when available as it may provide several advantages. For example, subscribers to AOL will get the benefit of AOL-specific features like parental controls. Furthermore, AOL and Yahoo users, as non-limiting examples, will see messages in their sent items folder, and messages routed in this manner may be more compliant with new spam policies such as Sender Policy Framework (SPF) and Sender Id. In addition, messages sent via corporate mail servers 52 will have proper name resolution both at the global address list level and the personal level. It should be understood, however, that the use of the mail service provider 50 to deliver mail may be dependent on partner agreements and/or protocol, depending upon the given implementation.

The architecture described above also advantageously allows for features such as on-demand retrieval of message bodies and attachments and multiple folder support. Moreover, a "this-is-spam" button or indicator may be used allowing company labels and other service provider-specific features when supported by an underlying protocol, as will be appreciated by those skilled in the art.

One particular advantage of the direct access system 20 is that a user need not configure an account before integrating additional accounts. However, a standalone email address may be used, and this address advantageously need not be tied to a mailbox size which the subscriber is required to manage. For example, the email account may be managed by an administrator, and any mail could be purged from the system after a predetermined period of time (i.e., time-based auto-aging with no mailbox limit for all users).

Additionally, all aspects of any integrated email account creation, settings and options may advantageously be available to the user from their mobile wireless communications device 25 Thus, users need not visit an HTML site and change a setting, create a filter, or perform similar functions, for example. Of course, an HTML site may optionally be used.

As a system Internet email service with the direct access system 20 grows, ongoing emphasis may advantageously be placed on the administrative site to provide additional information to carrier administrators, support teams, and similar functions. However, in some instances a mail connector may be installed on a personal computer, and this functionality may not always be available from the mobile wireless communications device.

The Web client engine 22 may advantageously support different features including message to handheld (MTH), message from handheld (MFH), forward/reply a message, request to view more for a large message (e.g., larger than 2K), request viewing message attachment, and over the air folder management (OTAFM). These functions are explained below.

For an MTH function, each email account integrated for a user is linked with the user device through a Web client service book. For each new message that arrives in the Web client user mailbox, a notification that contains the new message information will typically be sent to a Web client engine supervisor component (FIG. 3), which in turn will assign the job to an available worker with the least load in the system.

The chosen worker 32 will validate the user information and retrieve the new message from the user source mailbox and deliver it to the user device.

In an MFH function, MFH messages associated with a Web client service book are processed by the Web client engine 22 and delivered to the Internet 49 by the worker 32 via the simple mail transfer protocol (SMTP) or native outbox. If a user turns on the option to save the sent message to the sent items folder, the direct access proxy will save a copy of the sent message to this folder.

In a Forward/Reply/More function, the user can forward or reply an MTH or MFH message from the mobile wireless communications device 25 as long as the original message still existed in the direct access proxy cache or in user mailbox. For MTH, the worker 32 may send the first 2K, for example, or the whole message (whatever is less) to the user device. If the message is larger than 2K, the user can request MORE to view the next 2K of the message. In this case, the worker 32 will process the More request by retrieving the original message from the user source mailbox, and send back the 2K that the device requests. Of course, in some embodiments more than 2K of message text (or the entire message) may be sent.

In an attachment-viewing function, a user can view a message attachment of a popular document format (e.g., MS Word, MS Power Point, MS Excel, Word Perfect, PDF, text, etc.) or image format (GIF, JPEG, etc). Upon receiving the attachment-viewing request, which is implemented in a form of the More request in this example, the worker 32 can fetch the original message from the user source mailbox via the direct access proxy, extract the requested attachment, process it and send result back to the user device. The processing requires that the original message has not been deleted from the user Web client mailbox.

In the save sent message to sent items folder function, if the user turns this option on, the worker 32 places a copy of each MFH message sent from the user device in the user sent items folder in the mailbox. In over the air folder management, the Web client OTAFM service maintains any messages and folders in the user mailbox synchronized with the user device over the air.

Whenever a message in the user source mailbox is Moved/Deleted, the associated message on the device may also be Moved/Deleted accordingly, and vice-versa. When a message is Moved/Deleted on the device, the associated message in the user Web client mailbox may also be Moved/Deleted accordingly. Similarly, when a folder is Added/Removed/Renamed from the user Web client mailbox, the associated folder on the device may be Added/Removed/Renamed, and vice-versa.

The system 20 may advantageously support different subsets of various messaging features. For example, in the message to handheld function, the mobile office platform 24 may be responsible for connecting to the various source mailboxes 51, 53 to detect new emails. For each new mail, a notification is sent to the Web client engine 22 and, based on this notification, the supervisor 34 chooses one of the workers 32 to process that email. The chosen worker will fetch additional account information and the contents of the mail message from the direct access proxy 40 and deliver it to the user device 25.

In a message sent from handheld function, the MFH could be given to the direct access proxy 40 from the Web client worker 32. In turn, the mobile office platform 24 delivers a message to the Internet 49 by sending through a native outbox or sending it via SMTP. It should be understood, however, that the native outbox, whenever possible, may provide a better user experience, especially when taking into account current anti-spam initiatives such as SPF and sender Id.

In a message deleted from handheld function, when a message is deleted from the device 25, the Web client engine 22 notifies the mobile office platform 24 via the direct access proxy 40. As such, the mobile office platform 24 can delete the same message on the source mailbox.

When handling More/Forward/Reply/Attachment viewing requests, the Web client worker 32 may request an original mail from the direct access proxy 40. It will then process the request and send the results to the mobile wireless communications device 25. The architecture may additionally support on-demand retrieval of message parts and other upgrades, for example.

Upon the integration of a new source mailbox 51, 53, the service book notification from the alert server 38 may be sent to the supervisor 34, which assigns this notification to a worker 32 for sending out a service record to the device. Each source mailbox 51, 53 may be associated with a unique service record. In this way, each MFH message is linked with a source mailbox 51, 53 based on the service record on the device.

The system 20 may also poll the integrated external mailboxes periodically to check for new mail and to access any messages. The system 20 may further incorporate optimizations for polling bandwidth from an aggregation component allowing a quick poll. The system 20 can also advantageously support a large active user base and incorporate a rapidly growing user base.

The topology of load balancing can be based on the size of a component's queue and its throughput. These load statistics can be monitored by a mechanism in one example called the UDP Heartbeat, as described before. If a component is overloaded or has a large queue size, the component will have less chance to get an assigned job from other components. In contrast, a component will get more assigned jobs if it completes more jobs in the last few hours than other components. With this mechanism, the load could distribute over heterogeneous machine hardware, i.e., components running on less power machines will be assigned fewer jobs than those on machines with more power hardware.

General load balancing for any mobile office platform components can be accomplished through the use of a load balancer module, for example, a BIG-IP module produced by F5 Networks of Seattle, Wash. BIG-IP can provide load balancing and intelligent layer 7 switching, and can handle traffic routing from the Internet to any customer interfacing components such as the WAP and HTML proxies. The use of a BIG-IP or similar module may provide the application with pooling capabilities, fault tolerance and session management, as will be appreciated by those skilled in the art.

Typically, access to a single-source mailbox 51, 53 can be from a single direct access proxy 40 over a persistent connection. Any requests on behalf of a particular user could persist to the same machine in the same direct access clustered partition. As certain components are system-wide and will be handling work for users across many partitions, these components can be designed to determine which direct access partition to communicate with on a request-by-request basis.

The load balancer and cache (LBAC) 46 may support this function. The LBAC 46 is a system-wide component that can perform two important functions. The first of these function is that it provides a mapping from the device PIN to a particular direct access proxy 40, while caching the information in memory for both fast access and to save load on the central database. Secondly, as the direct access proxy 40 will be run in clustered partitions, the LBAC 46 may distribute the load across all direct access proxies within any partition.

The LBAC 46 can be formed of different components. For example, the code which performs the load balancing can be an extended version of a secure mail connector. The code can also perform lookups to the central database and cache the results (LBAC).

In one non-limiting example, when a worker requires that a direct access proxy 40 perform work, it provides the LBAC 46 with a device PIN. The LBAC 46 will discover which partition that PIN is associated with by looking in its cache, or retrieving the partition identifier from a central database (and caching the result). Once the partition is known, the LBAC 46 then consults its cache to see which direct access proxy in that partition has been designated to handle requests for that PIN. If no mapping exists, the LBAC requests the PDS to create a new association on the least loaded DA proxy 40 (again caching the result). Finally, the LBAC 46 responds to the worker 32 with the connection information for the proper direct access proxy to handle that particular request.

The secure mail connector 92 may run in failover pairs, where one is an active master and the other is a secondary standby. Internal data structures may be replicated in real-time from the master to the standby Multiple LBACs 46 can be run for scalability and fault tolerance, but typically would require an external connection balancing component, such as the BIG-IP component as explained before.

A receiving component in the Web client engine 22 saves the job that has been assigned to it from other components to a job store on the disk before processing. It can update the status of the job and remove the job from the job store when the job processing is completed. In case of component failure or if the process is restarted, it can recover the jobs from the job store and, based on the current statuses of these jobs, continue processing these jobs to the next state, saving the time to reprocess them from the beginning.

Any recovery from the standpoint of MTH/MFH can be achieved through current polling behavior and on the Web client engine 22 recovery mechanisms. From within the mail office platform components, until a message has been successfully delivered to a Web client engine 22, that message is not recorded in the partition database 60. During the next polling interval, the system can again "discover" the message and attempt to notify the Web client engine 22. For new mail events, if an event is lost, the system can pick up that message upon receiving the next event or during the next polling interval. For sources supporting notifications, this interval could be set at six hours, as one non-limiting example. For messages sent from the Web client engine 22, and for messages that have been accepted by the Web client engine, recovery can be handled by different Web client engine components.

The Web client engine 22 may advantageously be horizontally and vertically scalable. Multiple supervisors 34 can be registered/configured with direct access proxies 40 to provide the distribution of the notification load and the availability of engine service. Multiple workers 32 and port agents 30 can run on the same machine or across multiple machines to distribute load and achieve redundancy. As the number of users grows, new components can be added to the system to achieve high horizontal scalability.

It is possible for a new component to be added to or removed from the system automatically without down time. Traffic can automatically be delegated to a new component and diverted away from failed components. Each component within the mobile office platform 24 can be deployed multiple times to achieve horizontal scalability. To achieve vertical scalability, each mobile office platform 24 component can be a multi-threaded process with a configurable number of threads to scale under heavy load. Pools of connections can be used to reduce the overhead of maintaining too many open connections.

One example of a hand-held mobile wireless communications device 1000 that may be used in accordance the system 20 is further described in the example below with reference to FIG. 10. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 10:
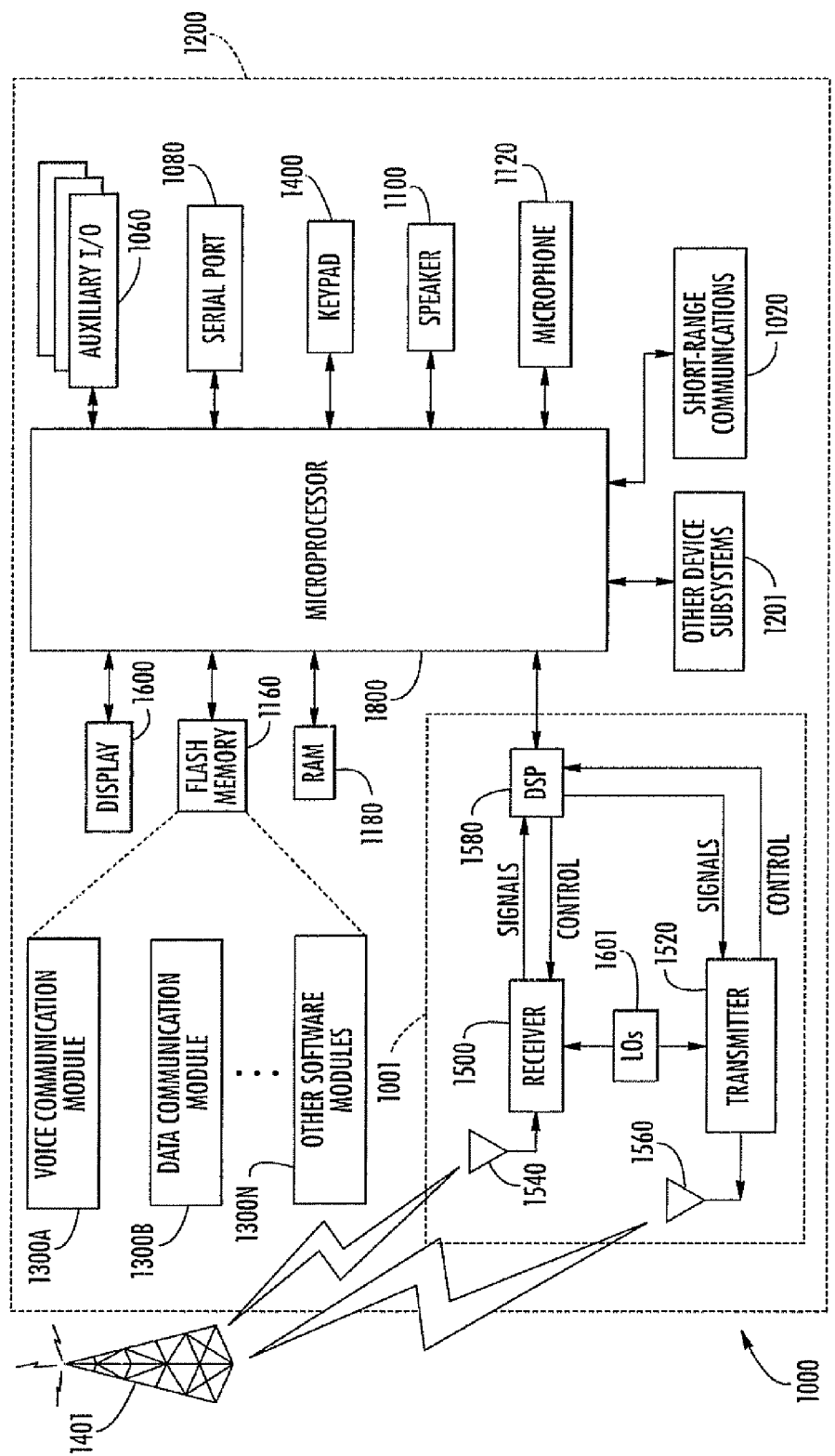
FIG. 10 is a schematic block diagram illustrating exemplary components of a mobile wireless communications device for use with the present invention.

In addition to the processing device 1800, other parts of the mobile device 1000 are shown schematically in FIG. 10. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etch, and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic mail (email) server apparatus comprising:
   at least one email job queue processor configured to:
   store email jobs for a user account;
   compare received email jobs for the user account with the stored email jobs, and discard any of the received email jobs that are duplicates of the stored email jobs;
   select a plurality of the stored email jobs associated with the user account up to a threshold number of email jobs;
   initialize a connection with an email storage server apparatus configured to store emails associated with the user account; and
   communicate with the email storage server apparatus to process only a number of the plurality stored email jobs equaling the threshold number of email jobs before switching to a different user account.

2. The email server apparatus of claim 1 wherein the plurality of email jobs from the at least one email job queue processor are processed in an order they are received.

3. The email server apparatus of claim 1 wherein the plurality of email jobs are sequentially processed.

4. The email server apparatus of claim 1 wherein the least one email job queue processor comprises a plurality of processing threads.

5. A communications system comprising:
   an electronic mail (email) storage server apparatus configured to store emails associated with a given user account; and
   an email proxy server apparatus comprising
   at least one email job queue processor configured to:
   store email jobs for a plurality of users;
   compare received email jobs with the stored email jobs, and discard any of the received email jobs that are duplicates of the stored email jobs;
   select a plurality of email jobs for a given user account up to a threshold number;
   initialize a connection with said email storage server apparatus; and
   communicate with said email storage server apparatus to process only a number of the plurality of stored email jobs equaling the threshold number of email jobs before switching to a different user account.

6. The communications system of claim 5 wherein the plurality of email jobs from the at least one email job queue processor are processed in an order they are received.

7. The communications system of claim 5 wherein the plurality of email jobs from the at least one email job queue processor are sequentially processed.

8. The communications system of claim 5 wherein the at least one email job queue processor comprises a plurality of processing threads.

9. An electronic mail (email) processing method comprising:
   at least one email job queue processor:
      storing email jobs for a user account;
      comparing received email jobs with the stored email jobs, and discard any of the received email jobs that are duplicates of the stored email jobs; and
      selecting a plurality of the stored email jobs associated with the user account up to a threshold number of email jobs;
      initializing a connection with an email storage server apparatus configured to store emails associated with the user account; and
      communicating with the email storage server apparatus to process only a number of the plurality of stored email jobs equaling the threshold number of email jobs before switching to a different user account.

10. The method of claim 9 wherein the plurality of email jobs are processed in an order they are received.

11. The method of claim 9 wherein the plurality of email jobs are sequentially processed.

12. The method of claim 9 wherein the at least one email job queue processor comprises a plurality of processing threads.

13. A non-transitory computer-readable medium comprising:
   at least one email job queue processor module configured to:
      store email jobs for a user account;
      compare the received email jobs for the user account with the stored email jobs, and discard any of the received email jobs that are duplicates of the stored email jobs;
      select a plurality of the stored email jobs for the user account associated with the user account up to a threshold number of email jobs;
      initialize a connection with an email storage server apparatus configured to store emails associated with the user account; and
      communicate with the email storage server apparatus to process only a number of the plurality of stored email jobs equaling the threshold number of email jobs before switching to a different user account.

14. The non-transitory computer-readable medium of claim 13 wherein the plurality of email jobs from the at least one email job queue processor module are processed in an order they are received.

15. The non-transitory computer-readable medium of claim 13 wherein the plurality of email jobs from the at least one email job queue processor module are sequentially processed.

16. The non-transitory computer-readable medium of claim 13 wherein the at least one email job queue processor comprises a plurality of processing threads.

* * * * *